United States Patent [19]

Vaniglia

[11] Patent Number: 4,907,754
[45] Date of Patent: Mar. 13, 1990

[54] FIBER PLACEMENT MACHINE

[75] Inventor: Milo M. Vaniglia, Southgate, Ky.

[73] Assignee: Cincinnati Milacron Inc., Cincinnati, Ohio

[21] Appl. No.: 808,911

[22] Filed: Dec. 13, 1985

[51] Int. Cl.[4] .............................................. B65H 81/04
[52] U.S. Cl. ..................................... 242/7.21; 156/425
[58] Field of Search ................. 242/7.21, 7.22, 3, 7.09, 242/7.11; 156/425, 429, 430, 431, 443, 446

[56] References Cited

U.S. PATENT DOCUMENTS

| | | | |
|---|---|---|---|
| 3,146,962 | 9/1964 | Hardwick | 242/7.21 |
| 3,363,849 | 1/1968 | McLarty | 242/7.21 |
| 3,378,427 | 4/1968 | McClean | 156/431 |
| 3,393,918 | 7/1968 | Styka . | |
| 3,616,078 | 10/1971 | Howard | 242/7.21 |
| 3,853,282 | 12/1974 | Wentworth | 242/75.2 |
| 4,068,536 | 1/1978 | Stackhouse . | |

OTHER PUBLICATIONS

The Composite, Filament Winding: What, How and Why, McClean Anderson Co., vol. 1, No. 4, Nov. 1980, 7 pp.

Primary Examiner—Stanley N. Gilreath
Attorney, Agent, or Firm—Thomas M. Farrell

[57] ABSTRACT

A base supports a workpiece form-holding means in either a stationary or rotatable manner. A cross-slide and corresponding fiber creel assembly which is affixed to, and depends from, the cross-slide assembly is carried with respect to the workpiece form-holding means by a hanging carriage carried on an overhead support beam. A fiber payout eye is carried on the cross-slide assembly for guiding fiber from the fiber creel assembly to the workpiece form as the carriage and cross-slide are moving.

8 Claims, 13 Drawing Sheets

FIBER PLACEMENT MACHINE

BACKGROUND OF THE INVENTION

The invention relates to fiber placement machines, and, in particular, relates to filament winding machines, wherein filaments or fibers are extended from a fiber creel assembly to a rotating form.

Typical uses of filament winding machinery are to create reinforced cylindrical shapes for pressure vessels, rocket casings, etc.

Certain prior art assemblies employ structures where the fiber support structure employs a vertically driven cross-slide, i.e. overhead to the horizontal rotating mandrel employed for work support, and the corresponding fiber creel assembly consisting of a plurality of fiber wound spools each threaded through a common payout eye, are carried overhead with the cross-slide. Other types of prior art assemblies employ a horizontally-movable cross-slide which feeds radially of a rotating work mandrel, in much the same manner as the cutting tool on a lathe. The horizontally-moving type machines are also provided with an overhead creel assembly to feed fibers to the payout eye.

It is to the latter type of machine that applicant's invention is directed, the difficulties inherent in the prior art overhead creel assembly being obviated by a novel machine design.

It is therefore an object of the present invention to provide a machine structure having a horizontally moving cross-slide supporting a fiber payout eye, wherein the creel assembly is readily accessible to support personnel.

Another object of the present invention is to provide the fiber placement machine having multiple axes of machine movement, wherein fiber may be placed on a convex, concave, or planar surface.

SUMMARY OF THE INVENTION

The invention is shown embodied in a fiber placement machine employing a base (which may include a common floor structure), wherein a workpiece form-holding means on the base supports a workpiece form along a substantially horizontal axis. In one alternate embodiment, the workpiece is rotatable about the horizontal axis. An improved fiber delivery assembly is comprised of an elongate support beam, oriented parallel to the horizontal axis and supported at opposite ends on a pair of uprights or support stanchions which, in turn, are supported on the base. A carriage depends from the support beam and is movable along a support way system in a first direction parallel to the horizontal axis; and a cross-slide assembly is supported by and movable on, a carriage way system in a second direction normal to the first direction. A fiber creel assembly, is affixed to and depends from the cross slide assembly, and a fiber payout means is located on the cross-slide assembly for guiding fiber from a fiber creel assembly to the workpiece form as the carriage and cross-slide are moving.

In additional alternate embodiments, the fiber payout means includes a multiaxis movable robotic wrist unit capable of guiding the fibers through multiaxes of spatial orientation so that fiber may be placed on concave, convex, or planar surfaces.

DESCRIPTION OF THE PREFERRED EMBODIMENT

Figure 1:
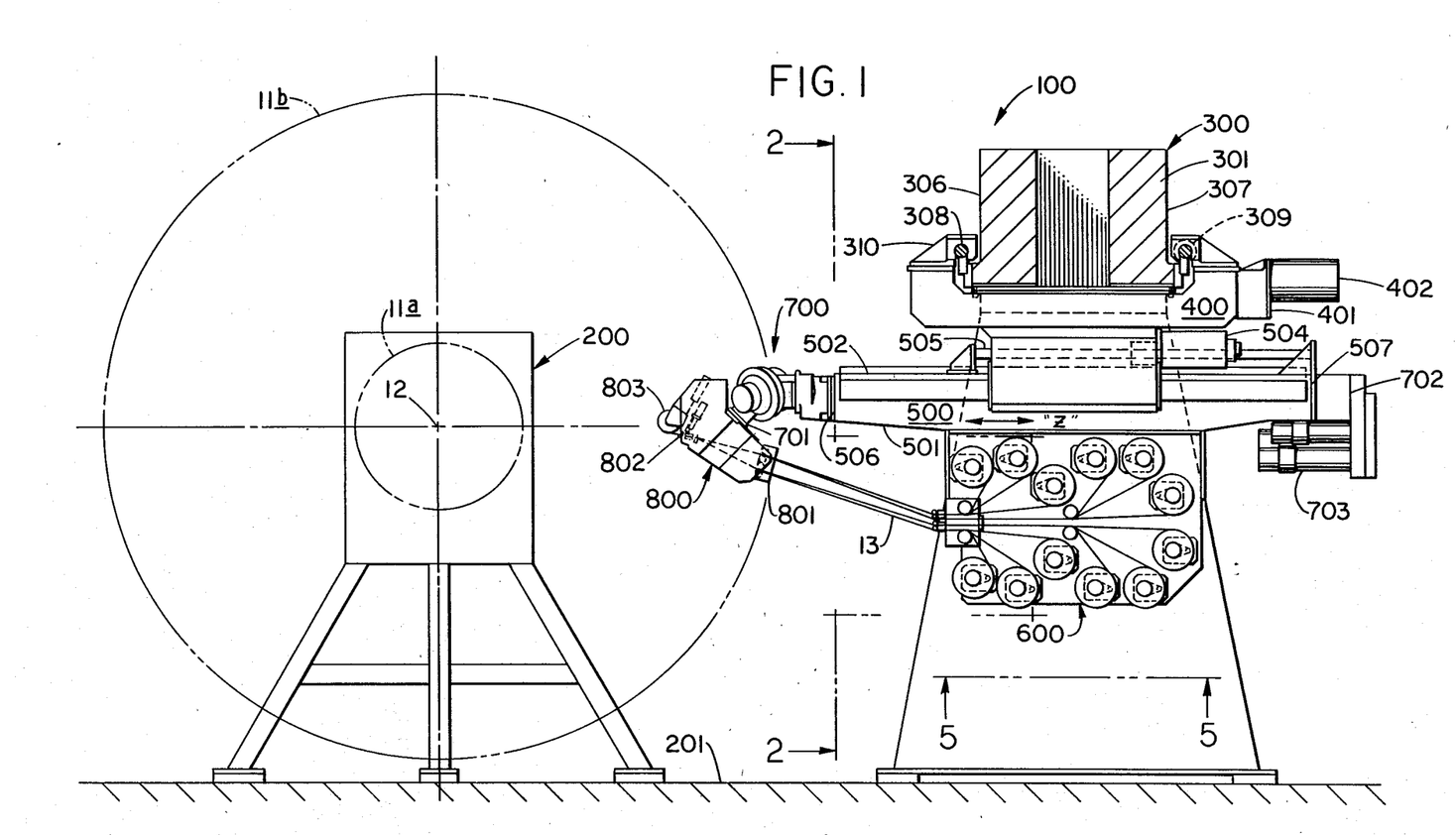
FIG. 1 is a side elevational section depicting a fiber placement machine.

Referring to FIG. 1, a conventional fiber placement machine 100 is depicted, having a workholding and driving mechanism 200 mounted to the floor. The floor 201 acts as a common base for the workholding and driving mechanism 200 and the fiber placement assembly 300. Here it may be appreciated that the design is chosen for its modularity, but that in certain instances, the workholding and driving mechanism 200 and fiber placement assembly 300 may be constructed on a unitary base structure, for example, a casting or weldment. The work-holding and driving mechanism 200 is not detailed, since it comprises any of a plurality of prior art units which have a drive box or boxes, capable of holding and (at desired intervals) rotating a plurality of workpiece forms 11a,b. Here it should be noted that when the work is rotated, the machine 100 is referred to as a "filament winder". However, it will be obvious to those skilled in the art, that further description of the machine 100 provides for the placement of fibers on a variety of surfaces, for example: concave, convex and planar.

The workpiece 11a,b forms are elongate, into the plane of the paper, and have their common axis 12 in a horizontal attitude (X-direction) to assist in loading and unloading the workpiece forms 11a,b.

Figure 2:
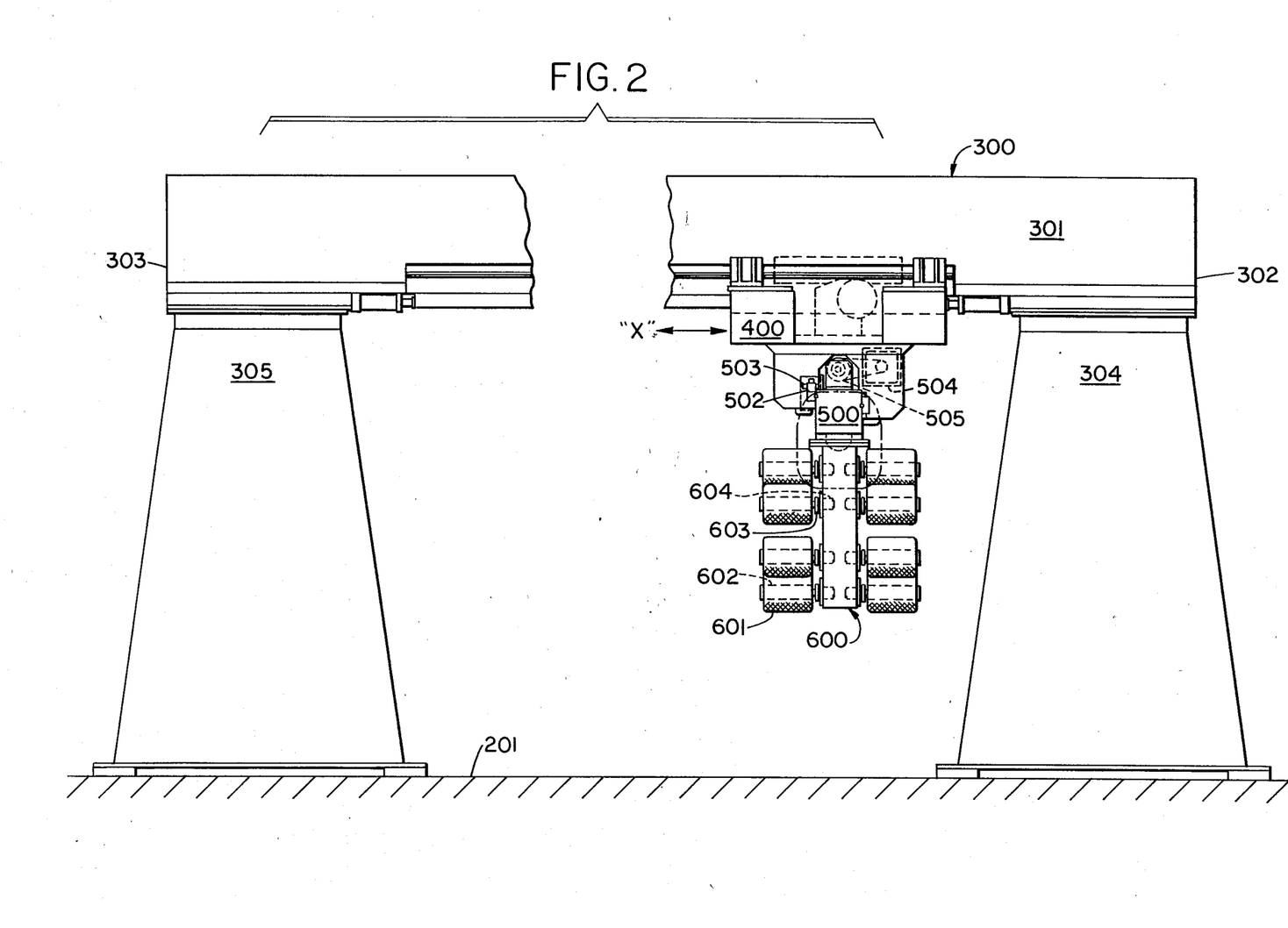
FIG. 2 is a front view of the fiber delivery support system of FIG. 1.

The fiber placement assembly 300 comprises an overhead horizontal support beam 301, depicted in cross-section as being bifurcated, but it may be appreciated by those skilled in the art that the beam 301 may be hollow and box-like, or solid, and still function as a support unit. The support beam 301 is, in turn, supported at opposite ends 302,303 (see FIG. 2) by end support stanchions 304,305 which are mounted on the floor 10. The cross-sectional view of FIG. 1 shows that the front and back faces 306,307 of the support beam 301 have parallel cylindrical bars 308 mounted thereto. The bars 308, in turn, carry open-type ball bushings 309, such as those manufactured commercially by the Thompson Bearing Company and manufactured under the trademark "ROUNDWAY" bearings. The bearings 309 are carried in brackets 310 which are bolted to an underslung carriage 400—that is, passing beneath the support beam 301—and thus, depending therefrom. The carriage 400 is provided with a drive box 401, drive motor 402, and rack and pinion (not shown) at the rear to propel the carriage 400 lengthwise down the support beam 301 in the "X"-direction.

The carriage 400 supports a cross-slide 500, which has elongate, hollow housing 501, and is carried on a square way system 502 mounted in antifriction recirculating roller bearings 503, also available from the Thompson Co. The cross-slide 500 is oriented to move at 90° to the horizontal, X-direction axis 12 of the workpiece form holding mechanism 200. A drive motor 504 and ball screw 505 are provided to propel the cross-slide 500 normal to the support beam 301. The cross-slide housing 501 supports a fiber creel assembly 600 on its lowermost face, so that the fiber spools, or creels 601, are readily accessible to machine support personnel, for purpose of maintaining the integrity of the fiber system and/or reloading the assembly 600. The fiber creels 601 are rotatable around horizontal shafts 602, extending outward from both sides of the creel assembly 600, parallel to the support beam 301. The motorized creel shafts 602 are held in bearings 603 and driven by a torque motor 604 so that fiber 13 or filament may be pulled from the creel 601 with a predetermined amount of fiber tension, and when slack occurs the torque motors 604 will back-drive to take up the slack, in a manner similar to that employed in composite tape-laying machines. In the preferred embodiment of FIG. 1, a robotic wrist unit 700 is carried on the front face 506 of the cross-slide housing 501 and, while construction details have been omitted, the wrist unit may be purchased commercially from the Cincinnati Milacron Inc., the assignee of the present invention. The wrist unit is essentially the same as that depicted in U.S. Pat. No. 4,068,536 and the reader is referred to that patent for constructional details. For purposes of understanding the present invention, it is sufficient to realize that the end effector plate 701, or tooling plate, is movable along triordinate axes, in accordance with internal drive gears and concentric tubes (not shown) which extend from the wrist unit 700 to the rear face 507 of the cross-slide housing 501, where the tubes are connected through a drive box 702 to a plurality of drive motors 703. The drive motors have the ability to drive ("roll") one, two, or three transversely-extending axes simultaneously to manipulate the end effector plate.

The end effector plate 701 carries a tooling package, comprising a fiber payout unit 800, wherein a plurality of fibers 13 are pulled from the creel assembly 600, through a guide roller assembly 801, and ultimately, through a fiber payout eye 802. In addition, the fiber payout unit 800 has a compaction roller 803 which may be optionally employed at predetermined times to assist in impressing the fibers 13 against a workpiece form 11a,b. The operation of the payout unit will be described further in connection with FIGS. 6-11.

Figure 3:
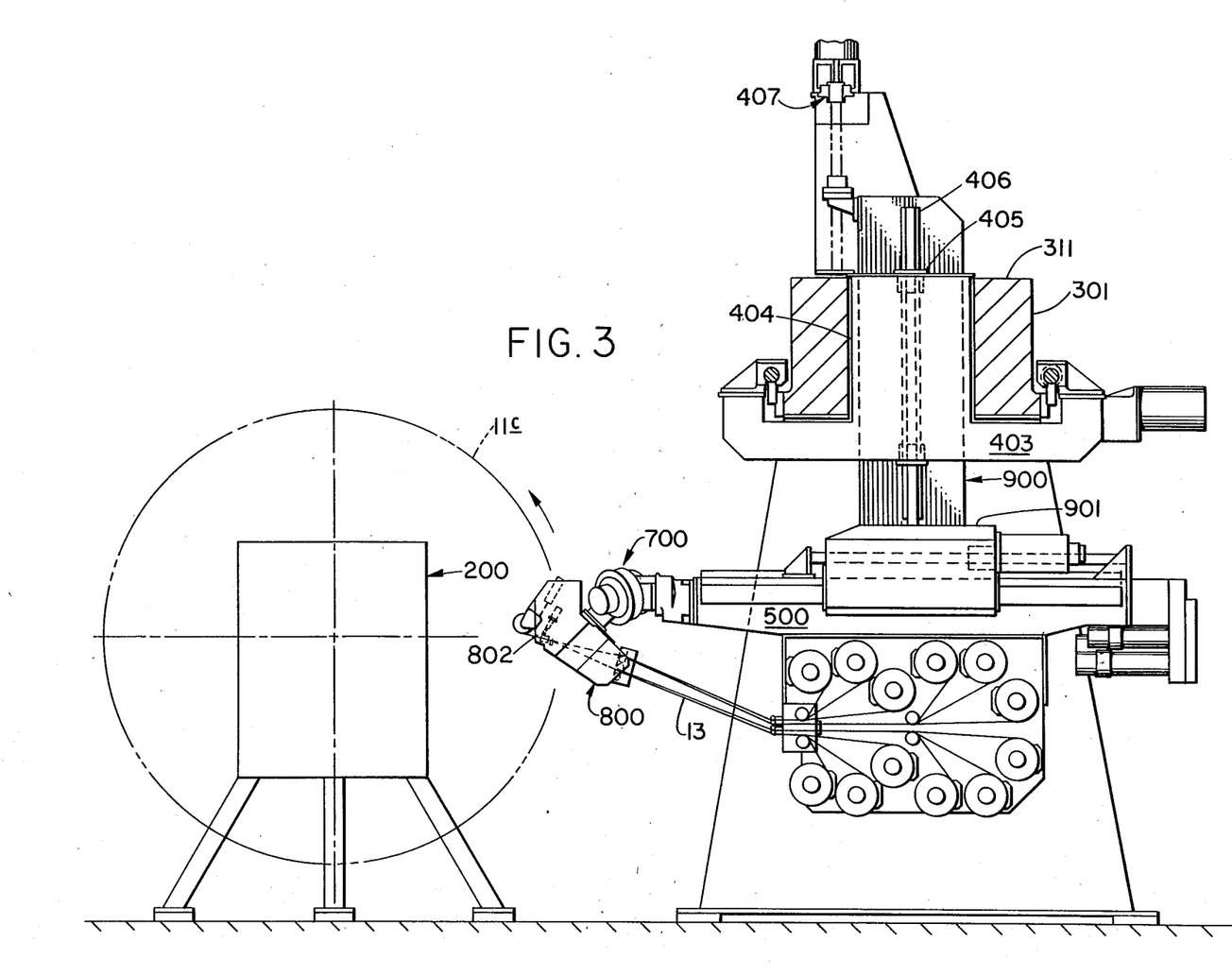
FIG. 3 is a side elevational section depicting a fiber placement machine having a vertical slide.
Figure 4:
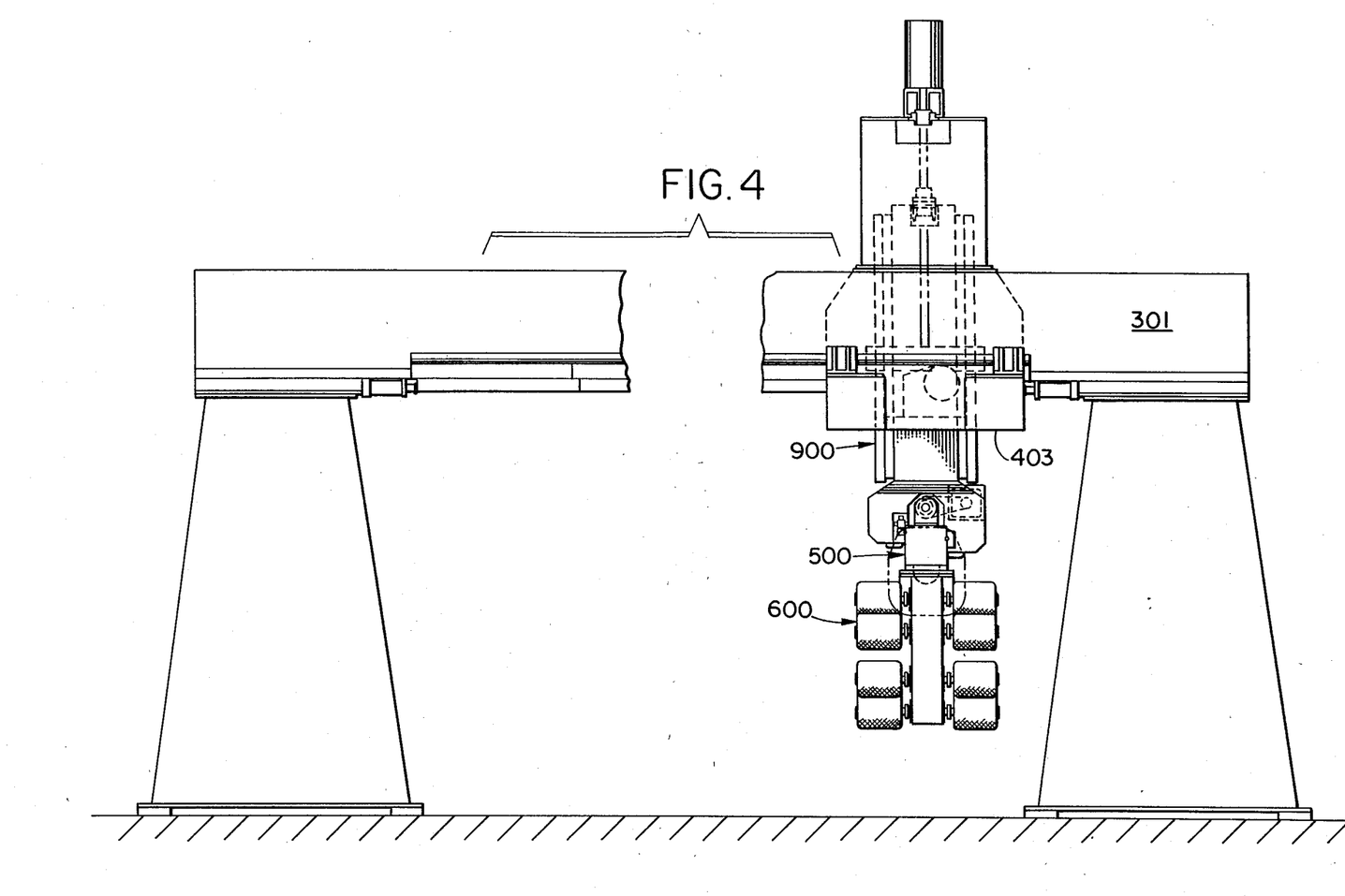
FIG. 4 is a front elevational view of the fiber delivery assembly support system.

FIGS. 3 and 4 depict a second version of the present invention wherein a vertical, or "Y"-axis is established for moving the payout eye 802 in a vertical fashion relative to a workpiece form 11c. The support beam 301 is again depicted as being bifurcated, and the carriage 403, resembling an inverted "T", has a central carriage stem portion 404 extending therebetween to the topmost surface 311. The carriage stem portion has top and bottom open type ball bushings 405, and ball bars 406 are fitted to a vertically-extending saddle unit 900 which is propelled by a ball screw drive 407 with respect to the carriage 403. The bottom section 901 of the saddle unit 900 serves to carry the cross-slide unit 500 in the manner depicted in FIG. 1.

Figure 5:
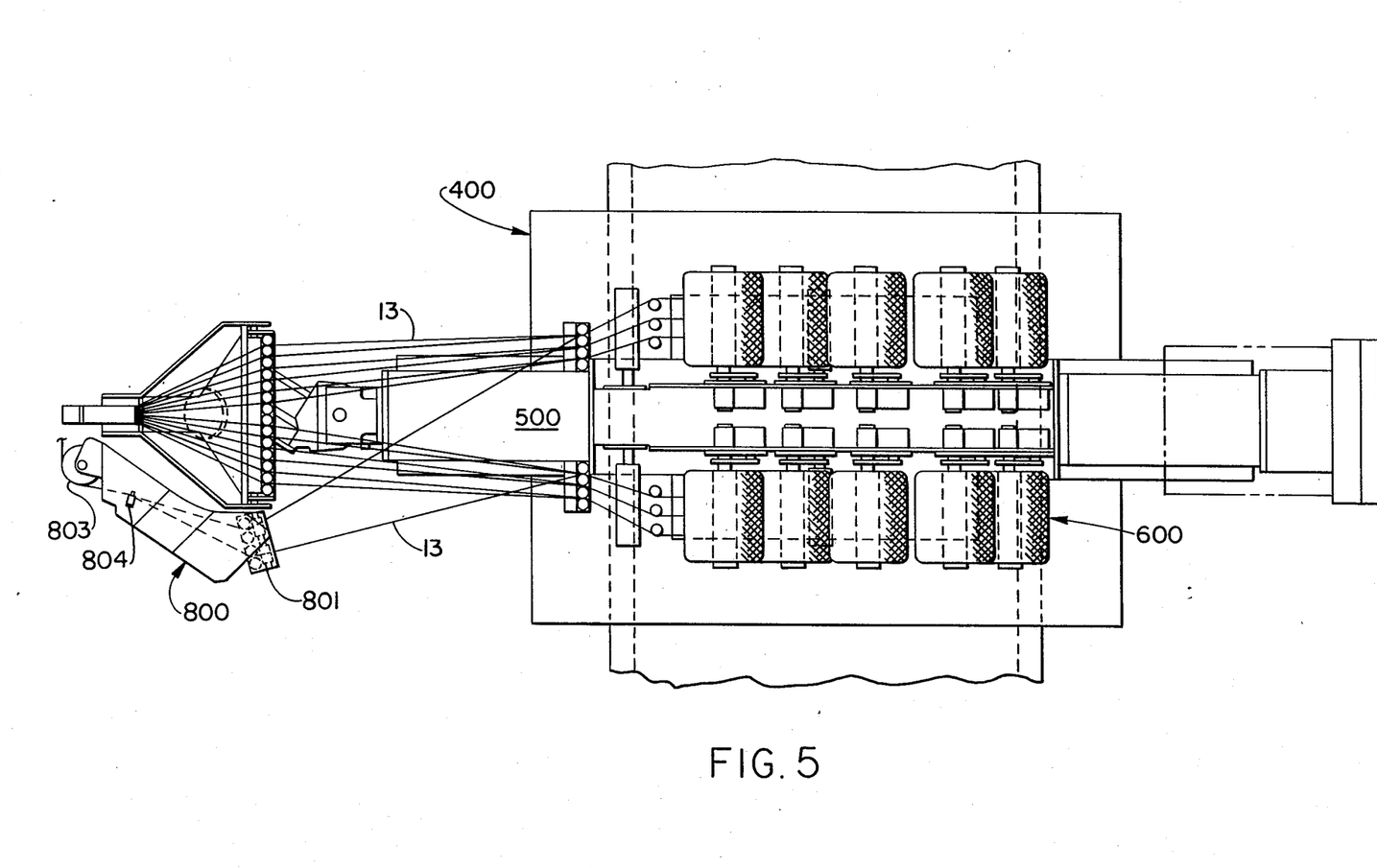
FIG. 5 is a bottom plan view of the creel and cross-slide assemblies taken in the direction of arrow 5 of FIG. 1.

The bottom view of FIG. 5 illustrates the creel assembly with the sideways-extending creels 601 of fiber, with individual fibers 13 being pulled through the guide roller assembly 801, and ultimately through a comb unit 804 to the fiber payout eye 802.

Fiber Payout Unit

Figure 6:
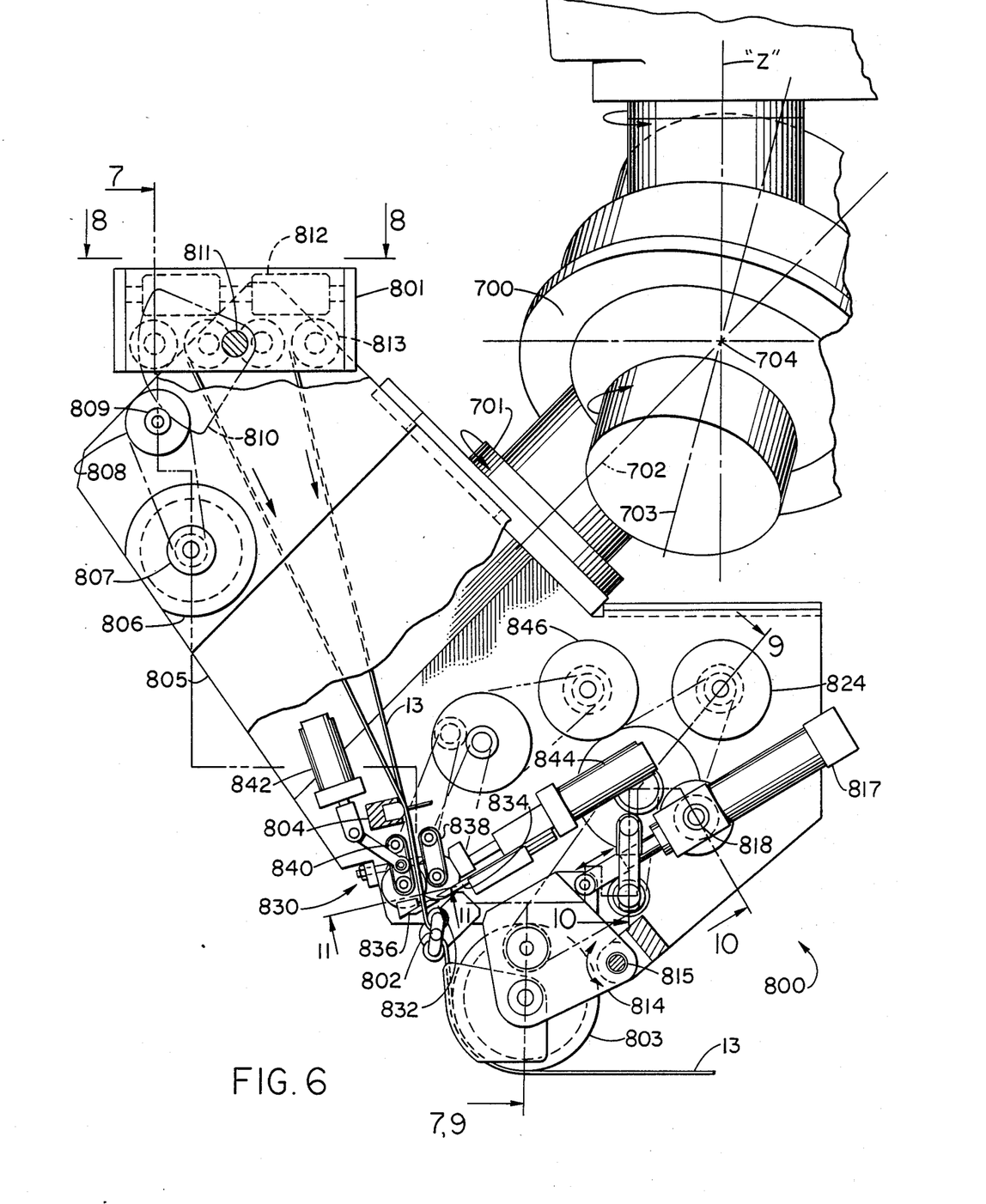
FIG. 6 is an enlarged side elevational view of the fiber payout assembly.
Figure 7:
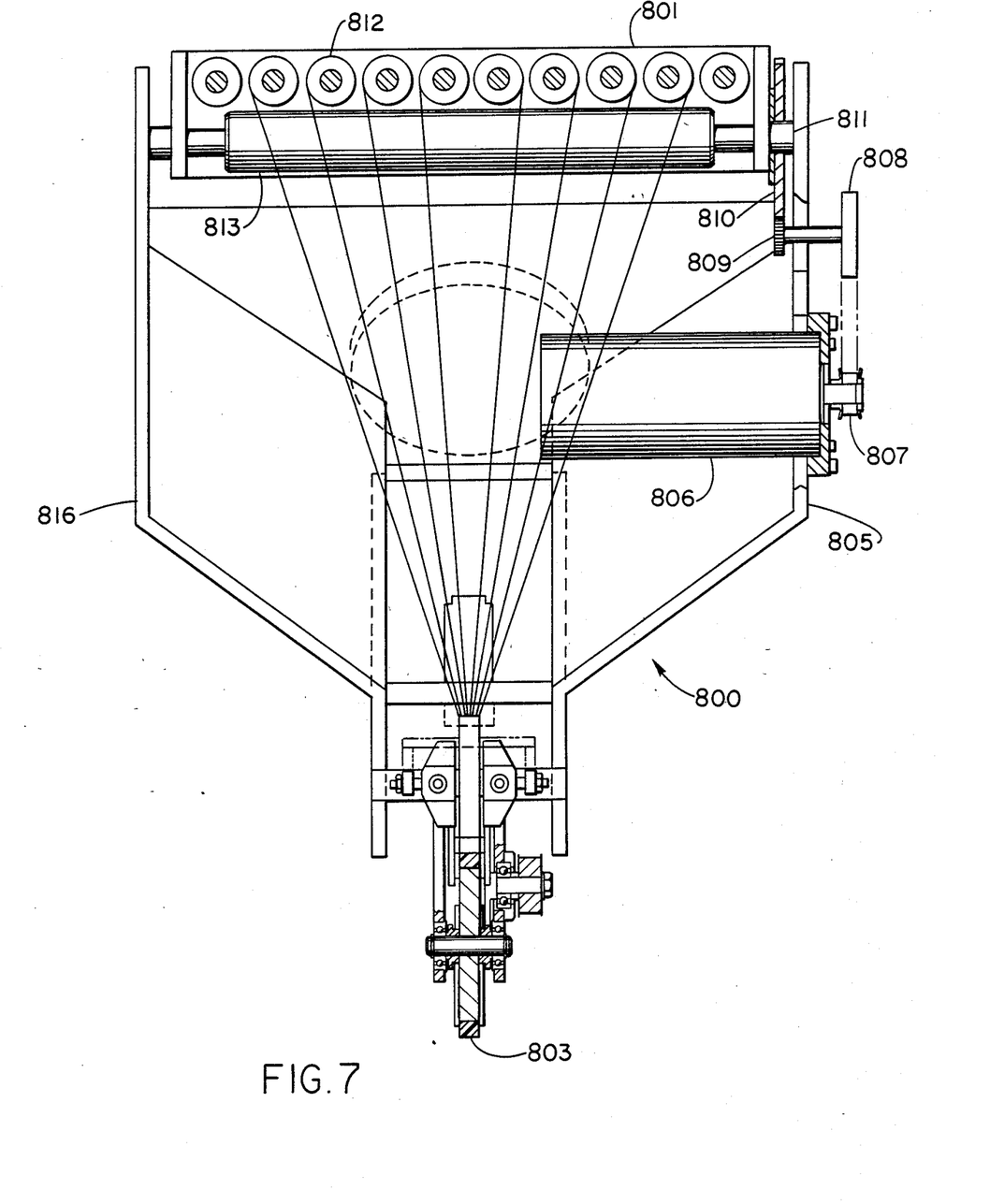
FIG. 7 is a front elevational view of the fiber payout assembly taken on line 7—7 of FIG. 6.
Figure 8:
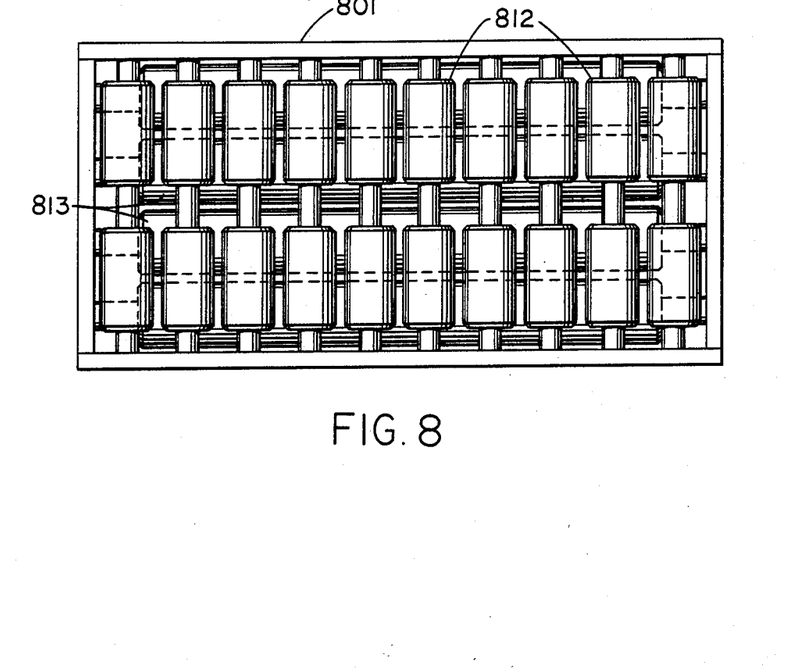
FIG. 8 is a plan view of the fiber guide assembly taken in the direction of arrow 8—8 of FIG. 6.
Figure 9:
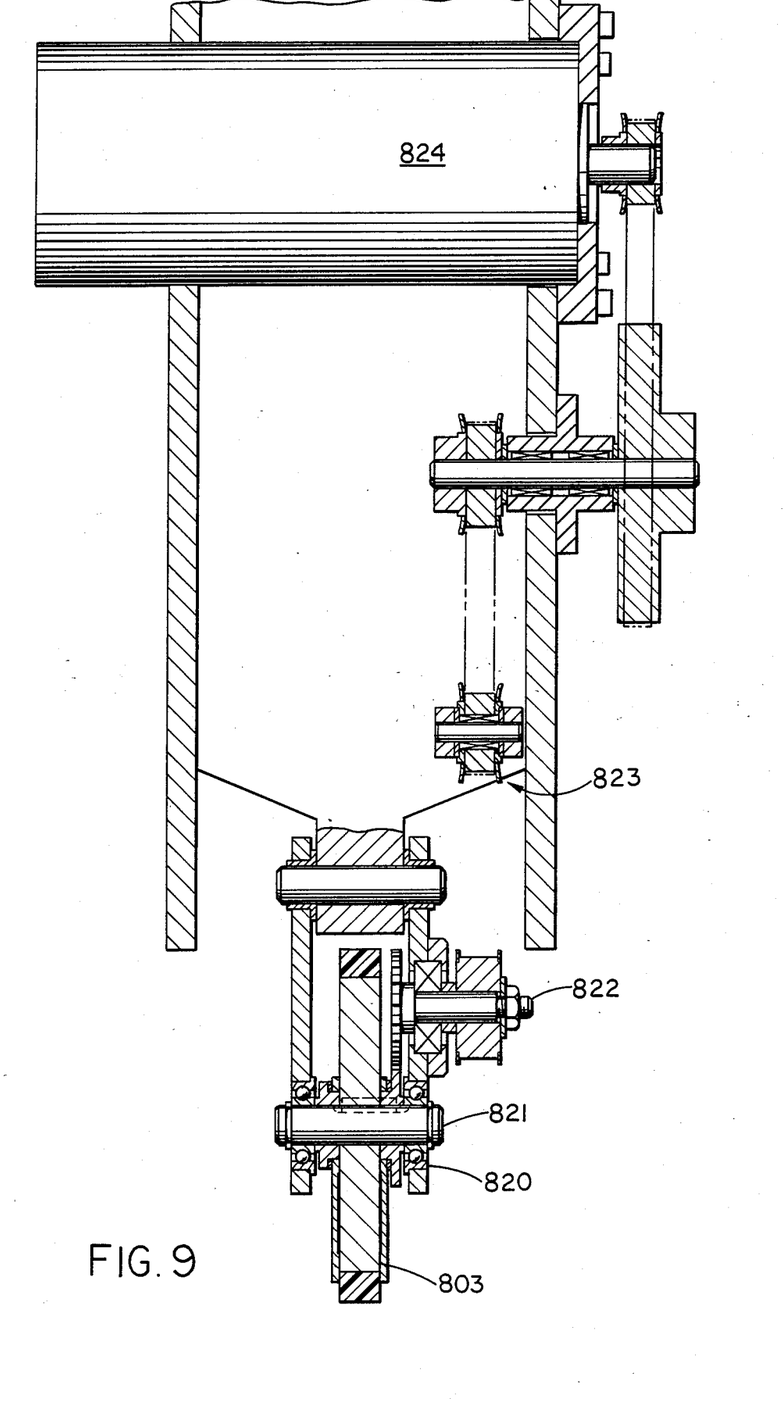
FIG. 9 is a section through the compaction roller of the fiber payout assembly, taken on the line 9—9 of FIG. 6.
Figure 10:
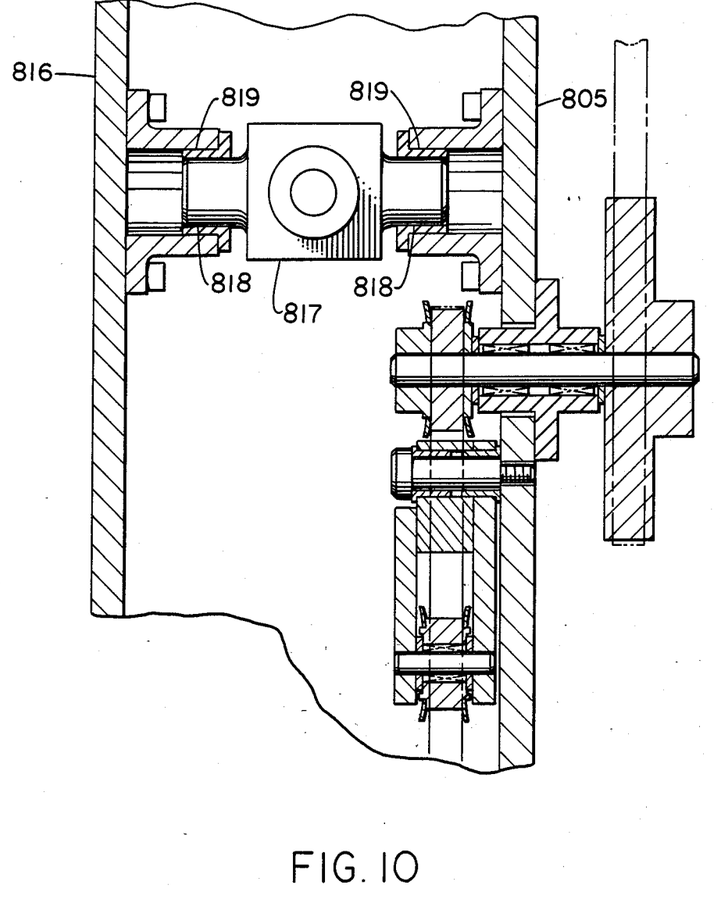
FIG. 10 is a section through the compaction roller pivot cylinder, taken along the line 10—10 of FIG. 6.
Figure 11:
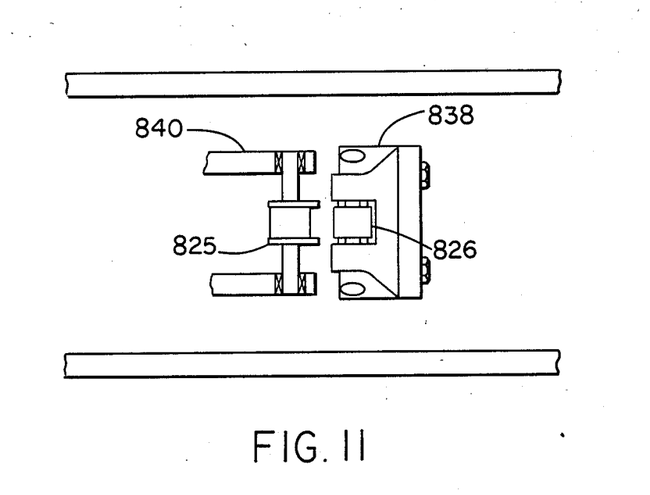
FIG. 11 is a section through the restart mechanism, taken along the line 11—11 of FIG. 6.

FIGS. 6-11 refer to the fiber payout unit 800, and in the partial section of FIG. 6, the unit 800 is shown mounted to the end effector plate of the wrist unit. The end effector plate 701 is rotatable around a first oblique roll axis 702 converging with the central longitudinal Z-axis of the cross-slide 500. The wrist unit 700 is also rotatable around the cross-slide unit Z-axis and the assembly is also rotatable around a second oblique axis 703 passing through the point of convergence 704 of the first axis 702 with the horizontal Z-axis. The side wall 805 of the payout unit 800 supports a torque motor 806 driving through a pair of sprockets 807,808 to a pinion 809 in mesh with a rotatable gear sector 810. The gear sector 810 serves to rotate the guide roller assembly 801 through a drive shaft 811. The fibers are guided across short and long crossed rollers 812,813; through an internal comb unit 804, through a restart mechanism 830, past a fiber cutter device 832, and through the payout eye 802. The payout eye 802 is normally the last element in the unit 800, but, as depicted in FIG. 6, a compacting roller 803 has been actuated to impress fibers 13 on a lay down surface, similar to the technique utilized in some composite tape laying machines. The compacting roller 803 is carried on a pivot plate 814 supported on a pivot pin 815 extending between the walls 805,816 of the payout unit 800. The plate 814 is moved between retracted and advanced (shown solid) positions by a clevis-mounted cylinder 817 which is supported on side trunions 818 in bearings 819 located within the side walls 805,816 of the payout unit 800 (see FIG. 10). FIG. 9 shows the bearing support system 820 for the compaction roller 803 with the roller shaft 821 geared to an output shaft 822 which is connected through a timing pulley/belt system 823 to a motor 824 for rotating compaction roller 803 when a new fiber placement is begun to achieve adhesion of the free ends of the fibers to the surface with minimal fiber slippage.

The fiber cutter device 832 and the restart mechanism 830 provide the means for automatically controlling placement of fibers with discontinuities in the fibers. The cutter knife 834, shown retracted in FIG. 6, severs the fibers against an anvil 836 leaving first free ends to be placed on the surface by further advance of the payout unit 800 and second free ends to begin a new fiber placement. Fiber placement beginning with the second free ends is started by use of the restart mechanism 830. The fibers are grasped above the second free ends thereof between grips belt 825 and 826 by advancement of the belt roller housings 838 and 840 effected by cylinders 842 and 844. The grip belts 825 and 826 are seen in end view in the belt roller housings 838 and 840 in FIG. 11. The grip belts 825 and 826 are advanced over their respective rollers by the motor 846 through the drive train of pulleys and belts depicted in FIG. 6. The second ends of the fibers are thus advanced through the payout eye 802 to the nip between the compaction roller 803 and the surface. Once the new fiber placement has begun and the second free ends are adhered to the surface, cylinders 842 and 844 retract belt roller housing 838 and 840 to release the fibers from the grasp of grip belts 825 and 826 to permit fiber placement to continue.

Figure 12:
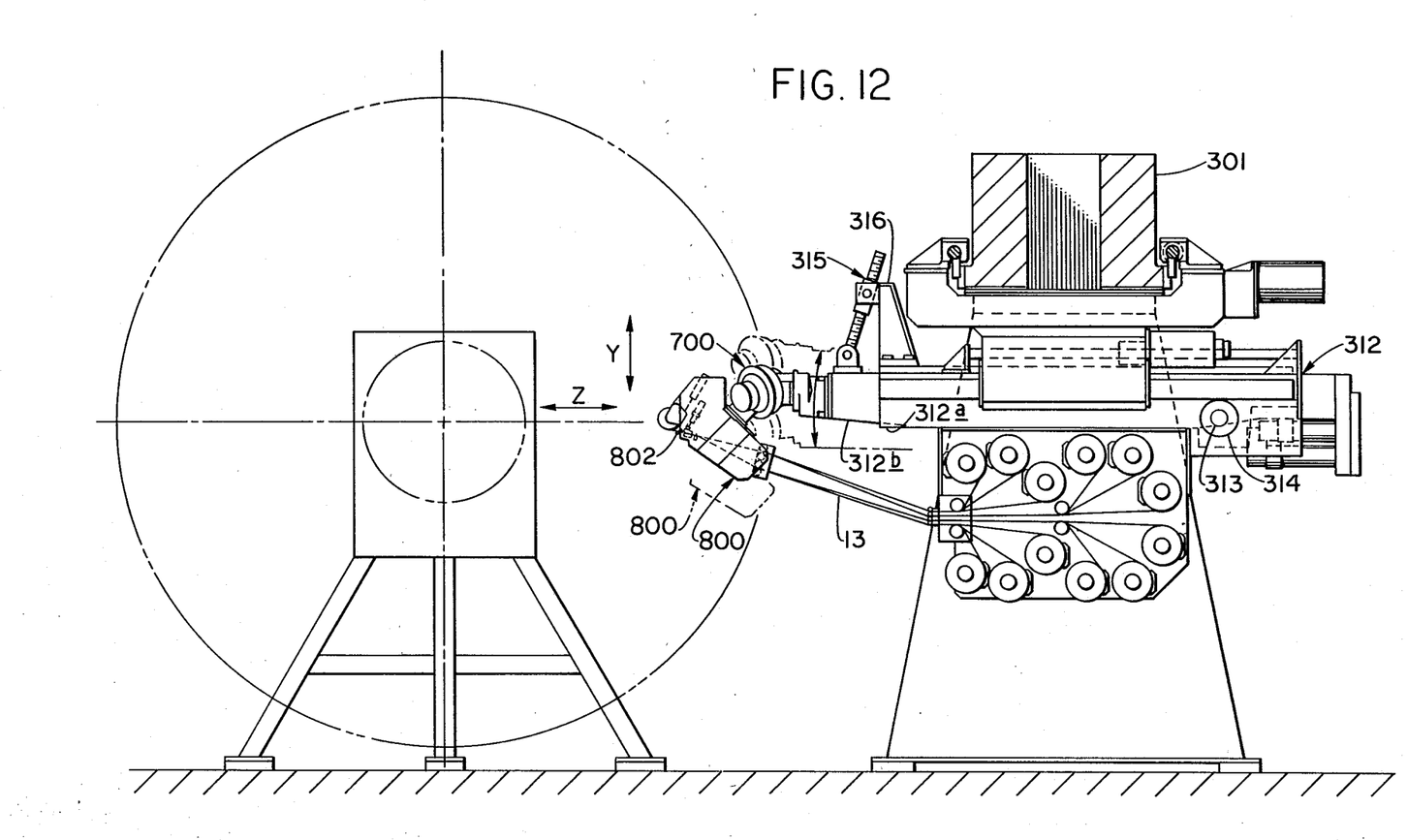
FIG. 12 is a side elevational section of a fiber placement machine utilizing pivoting motion for vertical movement.
Figure 13:
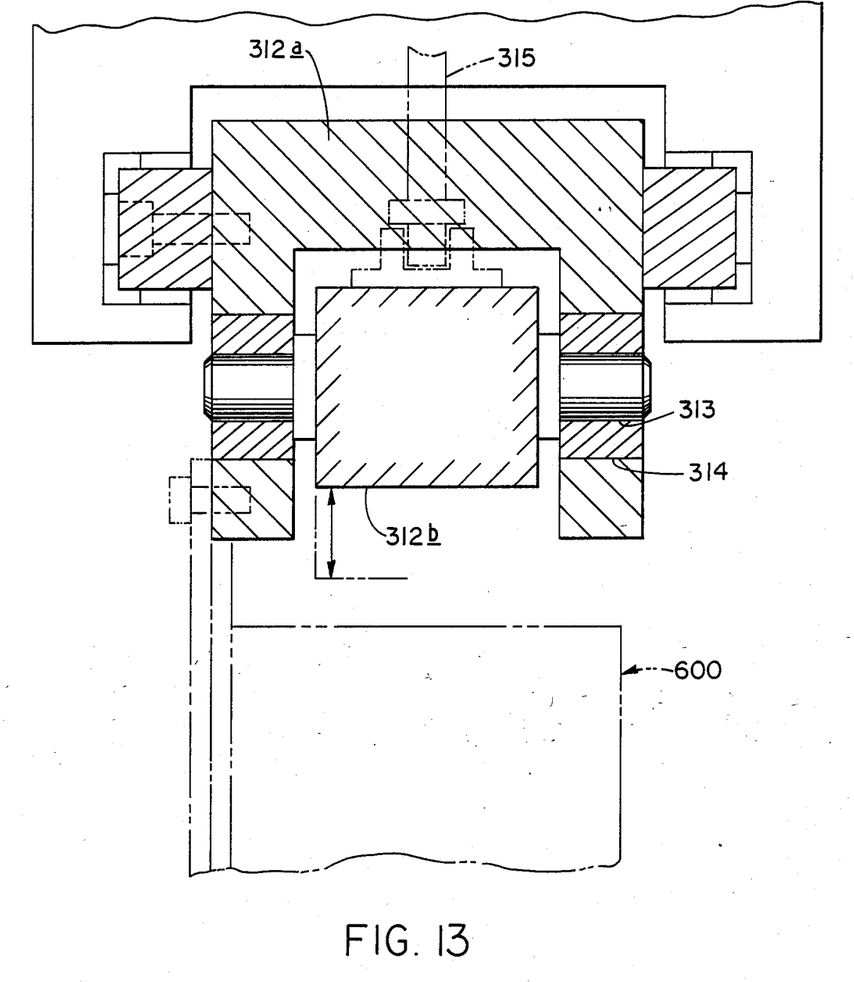
FIG. 13 is a front elevational section through the subslide and pivotable housing of FIG. 12.

In another embodiment of the fiber delivery assembly, FIGS. 12,13, the cross slide 312 is comprised of two members: a linearly movable subslide 312a supporting a pivotable housing 312b. The housing 312b has a pair of trunnions 313 near its rearmost end which are supported in side bearings 314 within the subslide 312a. The front of the subslide 312a has a linear actuator 315 (for example, the ball screw and nut system shown), clevis-mounted at the ends to a subslide bracket 316 and pivot housing 312b. By powering the actuator 315, a substantially vertical movement of the payout eye 802 may be achieved without the necessity of providing a vertical slideway system.

It may be appreciated by those skilled in the art, that the small horizontal movement seen at the payout eye 802 while the pivot housing 312b is moved, may be compensated-out by slight subslide movement effectuated by a machine control (not shown).

It may be also appreciated by those skilled in the art that the vertical component of the movement at the payout eye 802 is useful for dispensing fibers 13 onto a vertical planar surface, in absence of the Y-axis arrangement depicted in FIGS. 3 and 4.

While the preferred embodiment utilizes a robotic wrist unit 700 having three axes of roll movement, various submovements may be utilized and found within other, simpler robot wrists. For example, the payout eye 802 may be manipulated by a wrist having only small vertical movement. The robotic wrist may also be utilized to compensate for small, unwanted components of movement, for example, Z-axis movement resulting from pivot motion of the pivotable housing 312b.

While the invention has been shown in connection with a preferred embodiment and several alternate embodiments, it is not intended that the invention be so limited. Rather, the invention extends to all such designs and modifications as come with the scope of the appended claims.

What is claimed is:

1. In a fiber placement machine, having:
   a base; and
   a workpiece form-holding means on said base for supporting a workpiece form along a substantially horizontal axis:
   an improved fiber delivery assembly, comprising:
      a pair of support stanchions affixed to said base;
      an elongate horizontal support beam;
         beam ways parallel to said horizontal axis;
         opposite beam ends supported on said stanchions;
      a carriage mounted to said beam ways and depending from said beam;
      carriage ways normal to said horizontal axis;
      a cross slide assembly mounted to said carriage ways;
      means for moving said carriage on said beam ways between said stanchions;
      means for moving said cross slide on said carriage ways;
      a fiber creel assembly affixed to, and depending from, said cross slide assembly; and
      fiber payout means, mounted on said cross slide assembly, for guiding fiber from said fiber creel assembly to said workpiece form.

2. The fiber placement machine of claim 1, wherein said fiber payout means includes:
   a tooling plate;
   a fiber payout eye mounted to said tooling plate; and
   an articulatable robotic wrist means for moving said tooling plate in a direction normal to said beam ways and said carriage ways.

3. The fiber placement machine of claim 1, wherein said workpiece form-holding means includes:
   means for rotatably driving said workpiece form about said horizontal axis.

4. The fiber placement machine of claim 2, wherein said workpiece form-holding means includes:
   means for rotatably driving said workpiece form about said horizontal axis.

5. The fiber placement machine of claim 1, wherein said cross slide assembly includes:
   a first end proximal to said workpiece form-holding means, supporting said fiber payout means;
   a second end distal to said workpiece form-holding means; and
   a wrist means drive mechanism supported by said second end.

6. The fiber placement machine of claim 2, wherein said cross slide assembly includes:
   a first end proximal to said workpiece form-holding means, supporting said fiber payout means;
   a second end distal to said workpiece form-holding means; and
   a wrist means drive mechanism supported by said second end.

7. The fiber placement machine of claim 1, wherein said cross slide assembly includes:
   a subslice mounted on said carriage ways;
   a pivot housing rotatably journalled with said subslide for movement about a horizontal axis;
   means for securing said payout means to said pivot housing; and
   actuator means for pivoting said pivot housing with respect to said subslide and providing a vertical component of movement to said payout means.

8. The fiber placement machine of claim 2, wherein said cross slide assembly includes:
   a subslide mounted on said carriage ways;
   a pivot housing rotatably journalled with said subslide for movement about a horizontal axis;
   means for securing said payout means to said pivot housing; and
   actuator means for pivoting said pivot housing with respect to said subslide and providing a vertical component of movement to said payout means.

* * * * *

UNITED STATES PATENT AND TRADEMARK OFFICE
CERTIFICATE OF CORRECTION

PATENT NO. : 4,907,754

DATED : March 13, 1990

INVENTOR(S) : Milo M. Vaniglia

It is certified that error appears in the above-identified patent and that said Letters Patent is hereby corrected as shown below:

Column 6, line 3, claim 7, "subslice" should read --subslide--

Signed and Sealed this

Twenty-third Day of February, 1993

Attest:

STEPHEN G. KUNIN

Attesting Officer

Acting Commissioner of Patents and Trademarks